(12) United States Patent
Caudle

(10) Patent No.: US 6,964,112 B2
(45) Date of Patent: Nov. 15, 2005

(54) MEASURING INSTRUMENT

(76) Inventor: James T. Caudle, 526 A. Paradise Way W., Greenwood, IN (US) 46143

(*) Notice: Subject to any disclaimer, the term of this patent is extended or adjusted under 35 U.S.C. 154(b) by 43 days.

(21) Appl. No.: 11/074,181

(22) Filed: Mar. 7, 2005

(65) Prior Publication Data

US 2005/0144797 A1 Jul. 7, 2005

Related U.S. Application Data

(63) Continuation of application No. 10/627,217, filed on Jul. 25, 2003, now abandoned, and a continuation of application No. 09/842,541, filed on Apr. 26, 2001, now abandoned.

(51) Int. Cl.[7] ............................................. G01B 5/14
(52) U.S. Cl. ........................... 33/485; 33/490; 33/571
(58) Field of Search .......................... 33/755, 758, 759, 33/760, 770, 42, 44, 484, 485, 490, 41.1, 33/832, 833, 571; 403/344

(56) References Cited

U.S. PATENT DOCUMENTS

| | | | | |
|---|---|---|---|---|
| 1,046,187 A | * | 12/1912 | Hernlund .................... 33/468 |
| 1,157,545 A | * | 10/1915 | Johnson ..................... 403/344 |
| 1,322,993 A | * | 11/1919 | Alles ......................... 403/344 |
| 1,725,476 A | * | 8/1929 | Poppock ..................... 33/520 |
| 1,826,807 A | | 10/1931 | McDanel |
| 2,030,354 A | * | 2/1936 | Czemba ...................... 33/802 |
| 2,327,892 A | * | 8/1943 | Hidy .......................... 33/18.1 |
| 2,461,783 A | | 2/1949 | Stark |
| 2,606,371 A | * | 8/1952 | Klimek ....................... 33/490 |
| 3,217,418 A | * | 11/1965 | Wennerberg ................ 33/543 |
| 3,392,449 A | | 7/1968 | Tierney |
| 3,731,390 A | | 5/1973 | Sloan et al. |
| 4,065,855 A | * | 1/1978 | Coe ............................ 33/534 |
| 4,102,050 A | * | 7/1978 | Roth .......................... 33/437 |
| 4,228,594 A | | 10/1980 | Shlager |
| 4,233,747 A | | 11/1980 | Fisher |
| 4,281,461 A | | 8/1981 | Roe |
| 4,400,883 A | * | 8/1983 | Champlin ................... 33/832 |
| 4,531,296 A | | 7/1985 | Veeze |
| 4,999,924 A | * | 3/1991 | Shields ....................... 33/770 |
| D335,090 S | | 4/1993 | Guillen |
| 5,390,426 A | | 2/1995 | Hull |
| 5,421,093 A | * | 6/1995 | Davidson, Jr. ............... 33/42 |
| 5,606,803 A | | 3/1997 | O'Sullivan |
| 6,272,758 B1 | | 8/2001 | Wheeler |
| 6,604,296 B2 | * | 8/2003 | Mastrobattista ............ 33/640 |
| 6,629,372 B2 | * | 10/2003 | Doyle ........................ 33/429 |
| 6,757,981 B2 | * | 7/2004 | Hampton .................... 30/372 |

\* cited by examiner

*Primary Examiner*—R. Alexander Smith
(74) *Attorney, Agent, or Firm*—Woodard, Emhardt, Moriarty, McNett & Henry LLP

(57) ABSTRACT

A device for measuring and marking lines and points on a steel I-beam includes a rib for contacting the outside of an I-beam flange along a line opposite the center of the beam web, a measuring blade that rests on the beam web and measures distances from the outside of the flange, and a bridge for connecting the measuring blade to the rib in a way in which the measuring blade is held perpendicular to the flange. The device marks I-beams faster and more accurately that was possible using prior art tools and techniques.

6 Claims, 9 Drawing Sheets

MEASURING INSTRUMENT

This is a continuation of application Ser. No. 10/627,217, filed Jul. 25, 2003 and of application Ser. No. 09/842,541, both now abandoned.

The present invention relates generally to measuring devices, and more particularly to a device for measuring and marking lines and points on steel I-beams.

BACKGROUND OF THE INVENTION

Steel I-beams are frequently used to build frameworks for large buildings and construction projects. The beams are connected together with bolts that must be positioned precisely given the large scale of the building. When the bolts are positioned even ⅛ of an inch off center, the stability of the project is endangered as the error is compounded over tens or hundreds of feet.

The measurement process is complicated by the fact that measurements are defined from the outside of the beam flange, while the hole itself is drilled in the beam web. Thus, it is impossible to use a standard tape measure, for example, to measure the required distance directly. Instead, a square is generally used in combination with a tape measure, to make the appropriate measurement.

More particularly describing the prior art as shown in FIGS. 1–4, an I-beam 10 comprises a web 11 and two side flanges 12. Typically, the intersection of web 11 and flanges 12 is rounded rather than square, defining radius 13 at the web/flange intersection.

To measure the locations of holes to be drilled in the beam, a tape measure 14 is first used to measure predetermined distances from one end of the beam. Marks 15 are used to indicate those distances. A square 17 is then used to mark lines 16 perpendicular to the flanges at those measured distances, generally by positioning the square an indicated in FIG. 3. Square 17 is then turned on its end and is used in conjunction with tape 14 to mark distances from the outside of the flange, as shown in FIG. 4. Square 17 and tape 14 generally cannot be used to measure that distance directly, due in large part to the curvature of the intersection between the web and the flange.

The precision of the foregoing method of measurement depends, in part, on whether the flanges are truly at right angles to the web. If one flange is bent in or out a little, the distance measured from the top of the flange will not be the same as the distance along the web. This leads to errors in marking holes, since the method uses distances from the top of the flange as a guide. In addition, the speed of the foregoing method is unsatisfactory since multiple tools and measurements are required for each point.

A need therefore exists for a method of measuring and marking lines and points on I-beams that doesn't require a combination of tools, and that is more exact than the method of the prior art. The present invention addresses that need.

SUMMARY OF THE INVENTION

Briefly describing one aspect of the present invention, there is provided a device for measuring and marking lines and points on a steel I-beam. The device comprises:

(a) a flange-contacting portion for contacting the flange of an I-beam to be marked, and for defining a line parallel to the flange;

(b) a measuring blade for measuring distances from the flange-contacting portion along the web of the beam; and (c) a bridging portion for connecting the measuring blade to the flange-contacting portion by bridging the beam flange. The bridging portion connects the measuring blade to the flange-contacting portion in a way in which the measuring blade is perpendicular to a line parallel to the flange.

One object of the present invention is to provide a device for marking I-beams faster and more accurately that was possible using prior art tools and techniques.

Other objects and advantages will be apparent from the following description.

DESCRIPTION OF THE PREFERRED EMBODIMENTS

For the purposes of promoting an understanding of the principles of the invention, reference will now be made to certain preferred embodiments and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

As indicated above, one aspect of the present invention relates to a device for measuring and marking lines and points in a steel I-beam. The preferred embodiment of the device comprises: (a) a flange-contacting portion for contacting the flange of an I-beam to be marked, and for defining a line parallel to the flange; (b) a measuring blade for measuring distances from the outside of the flange along the web of the beam; and (c) a bridging portion for connecting the measuring blade to the flange-contacting portion by bridging the beam flange. The bridging portion connects the measuring blade portion to the flange-contacting portion in a way in which the measuring blade is perpendicular to a line parallel to the flange.

Figure 1:
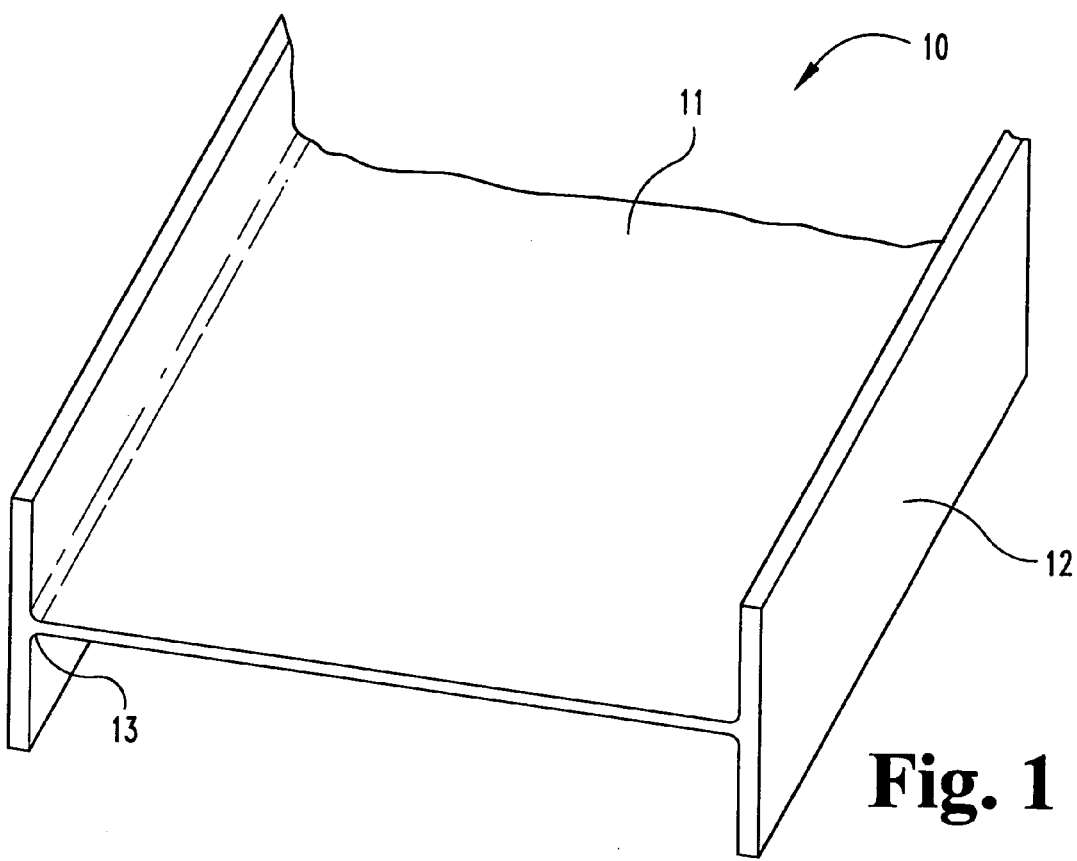
FIG. 1 is a perspective view of a steel I-beam.
Figure 2:
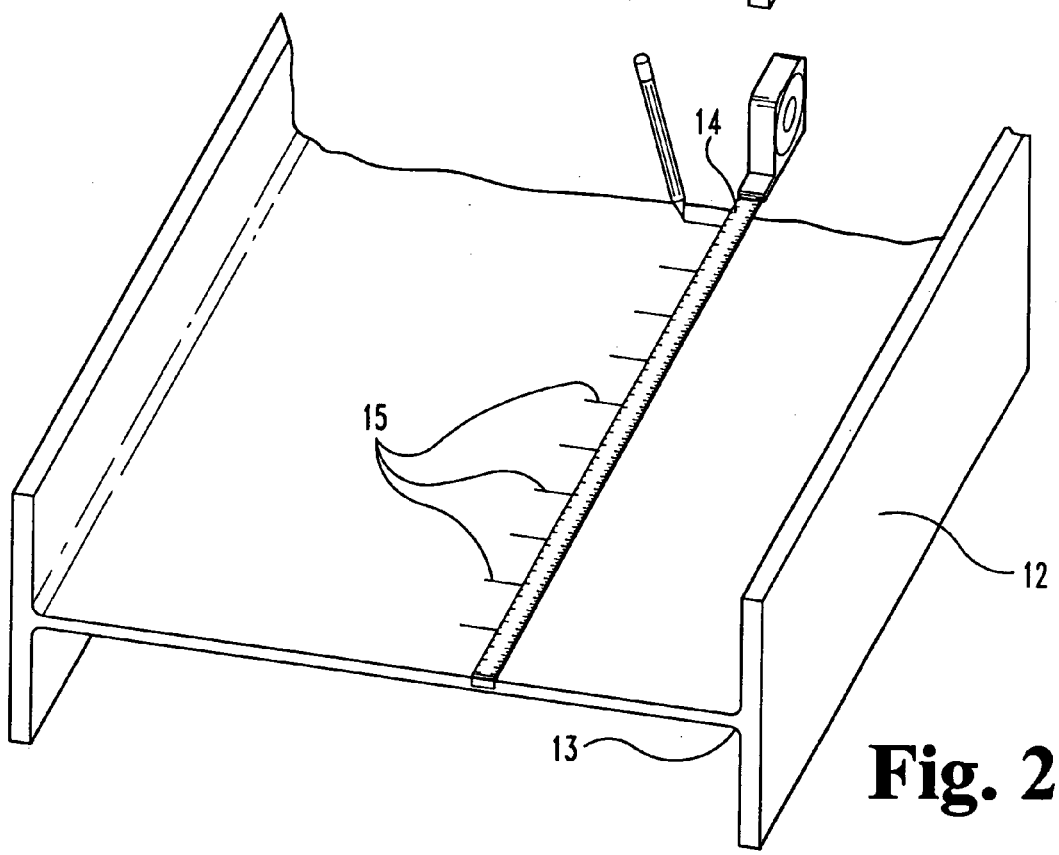
FIG. 2 is a perspective view of the I-beam of FIG. 1, showing a tape measure being used to measure distances from one end of the beam.
Figure 3:
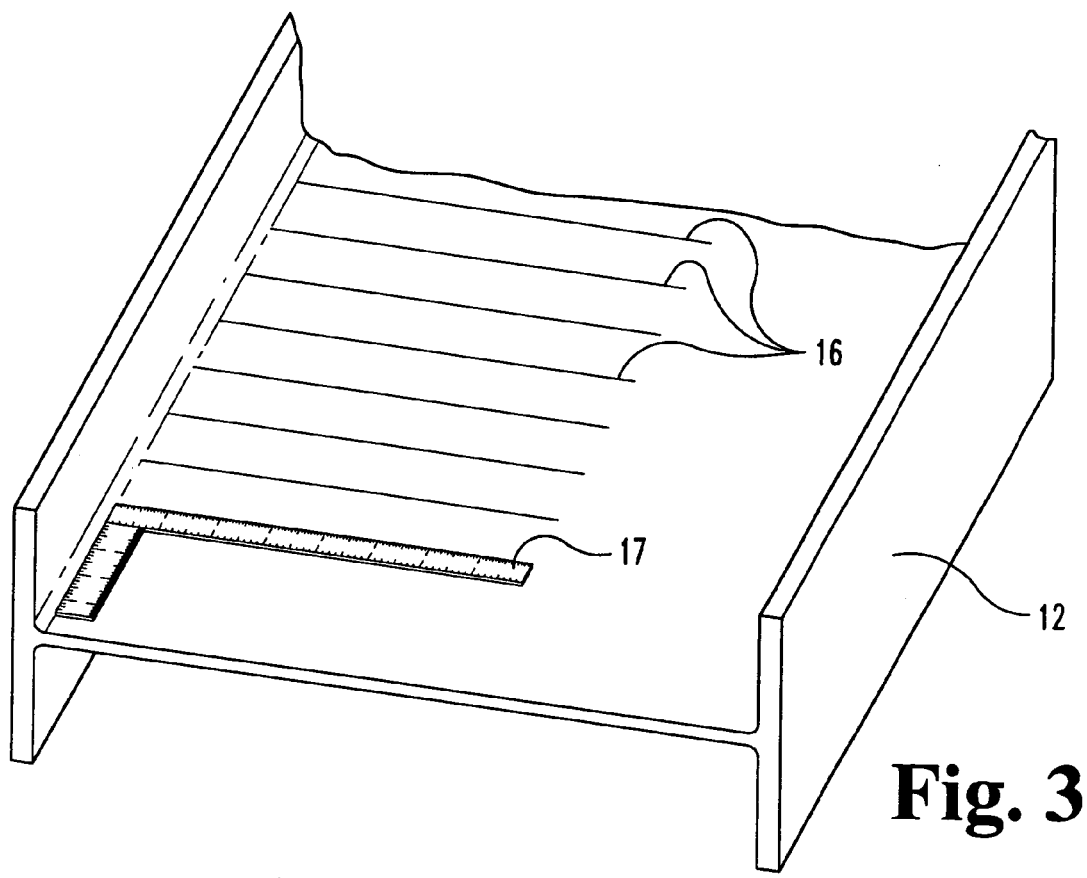
FIG. 3 is a perspective view of the I-beam of FIG. 1, showing a square being used to mark perpendicular lines at the measured distances.
Figure 4:
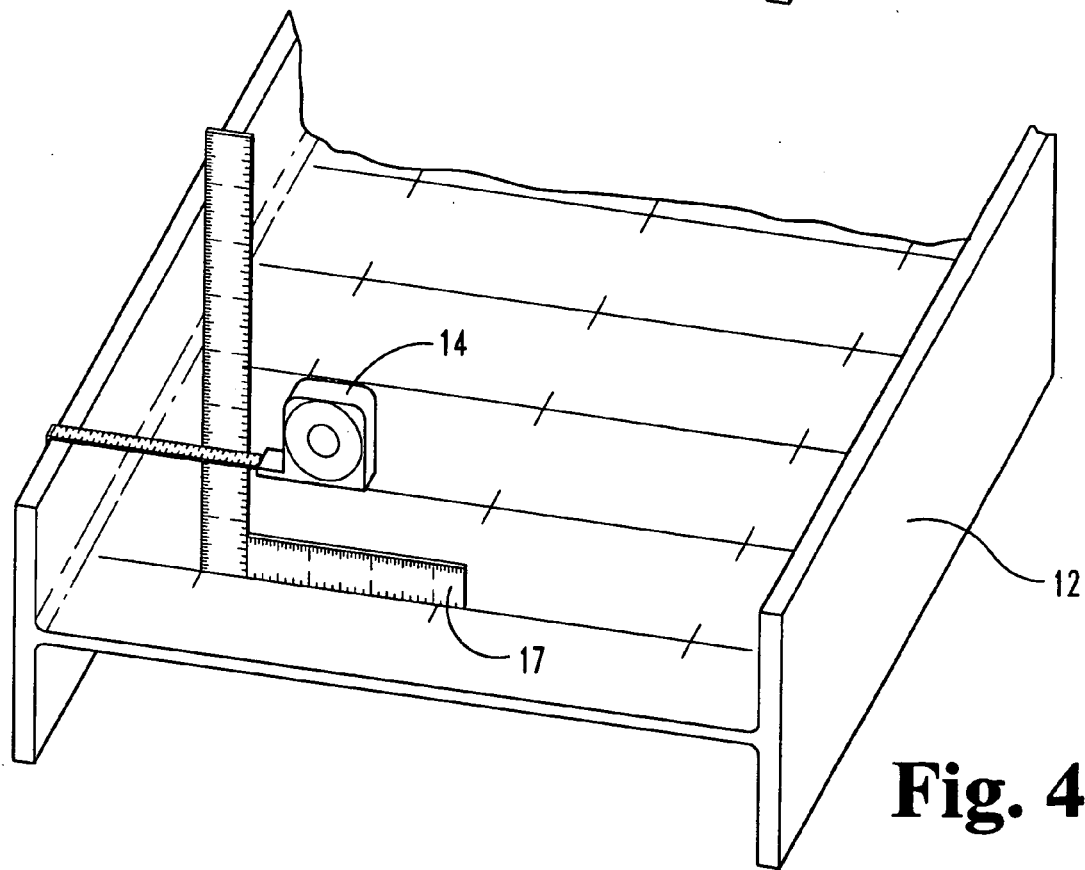
FIG. 4 is a perspective view of the I-beam of FIG. 1, showing a square and a tape measure being used to mark the locations of holes.
Figure 5:
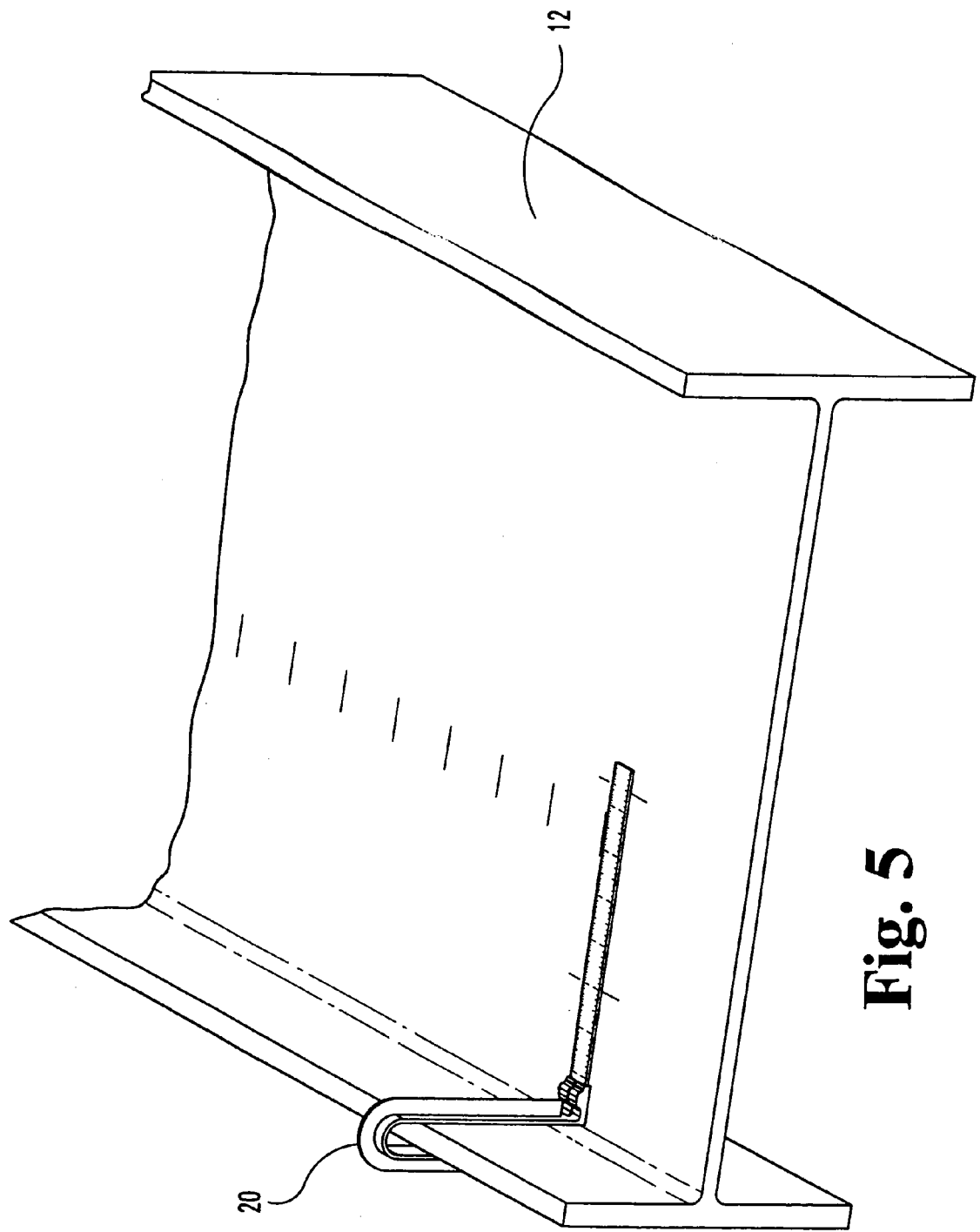
FIG. 5 is a perspective view of the I-beam of FIG. 1, showing the present invention being used to mark the locations of holes.
Figure 6:
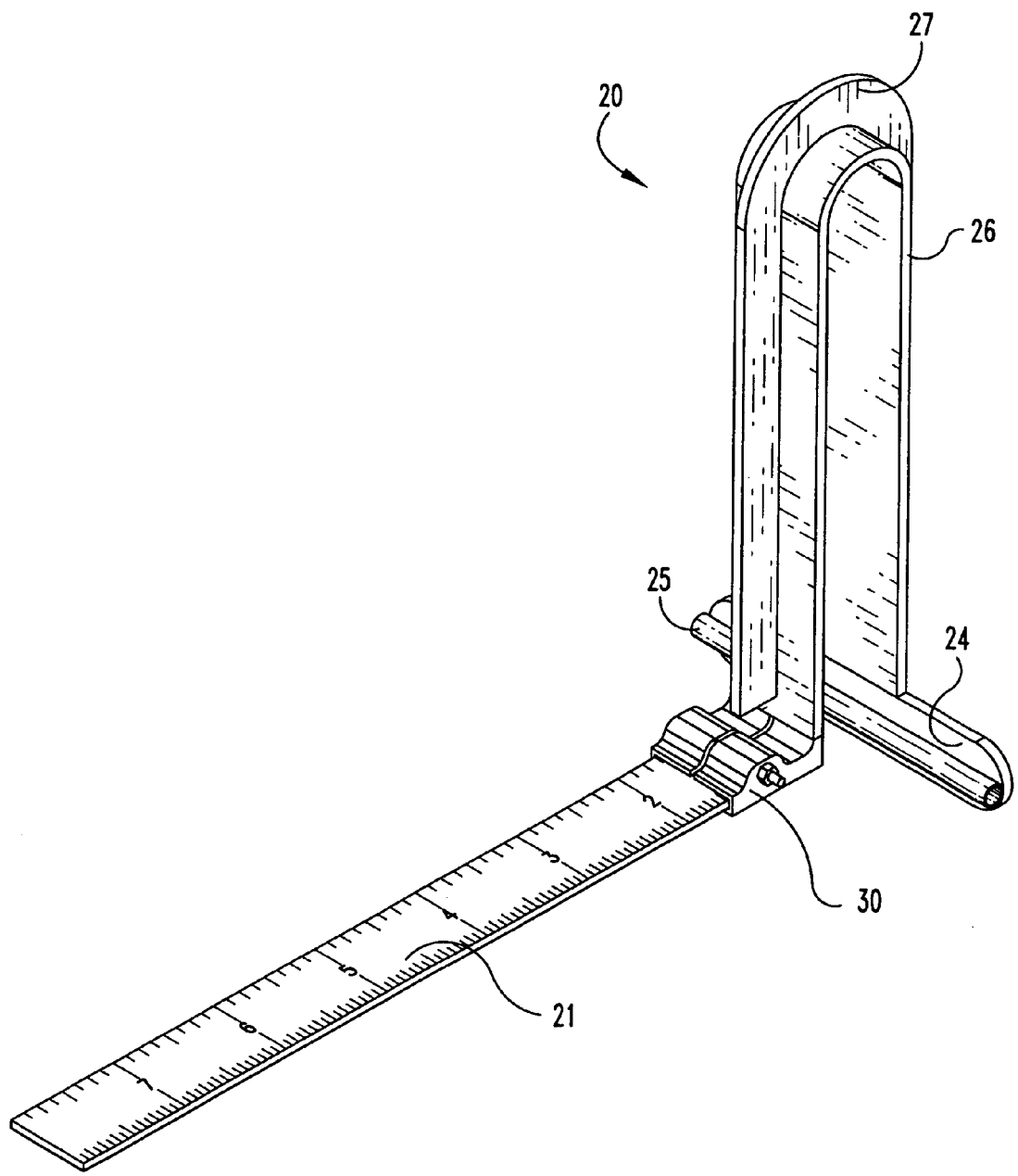
FIG. 6 is a perspective view of one embodiment of the measuring device of the present invention.
Figure 7:
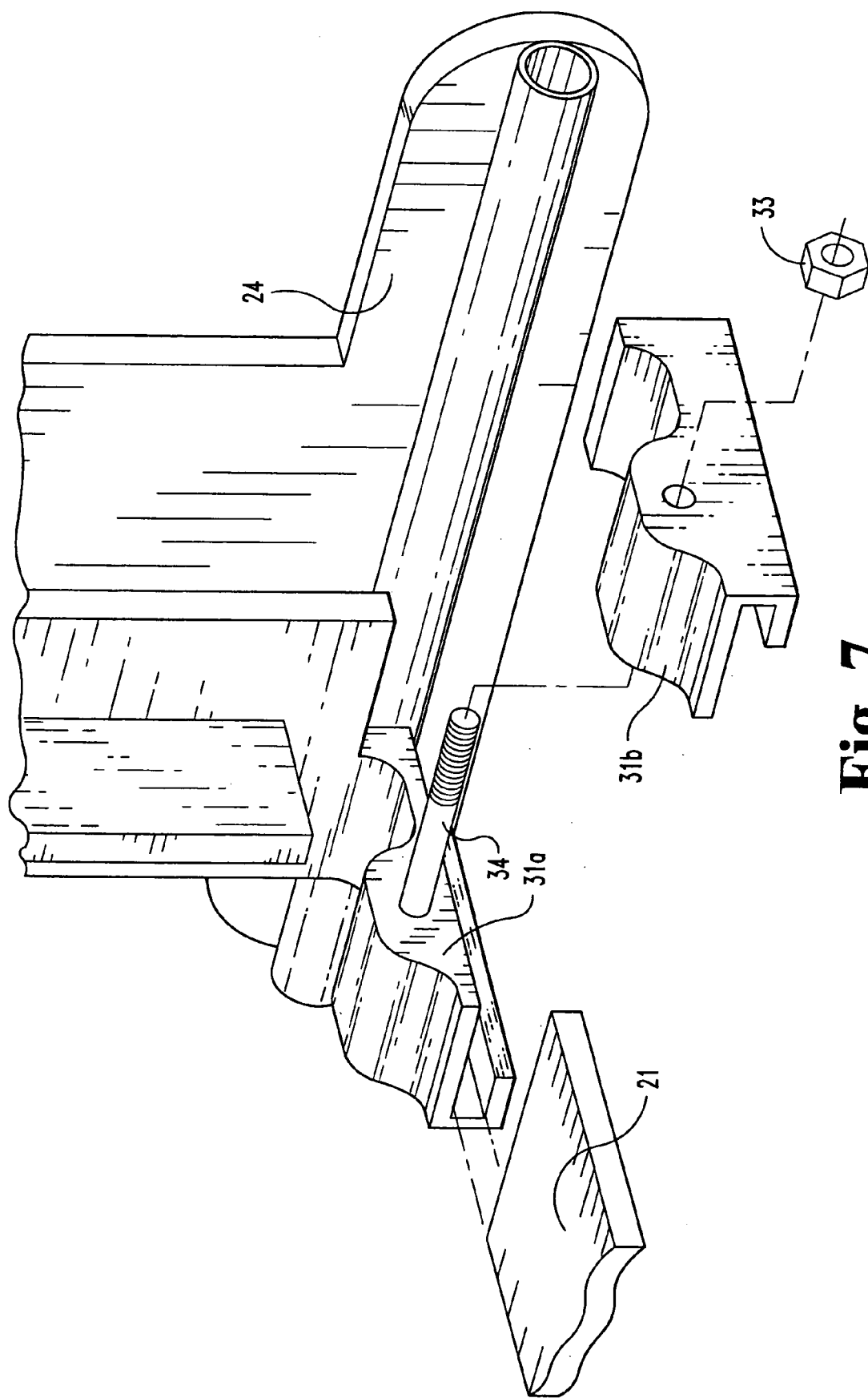
FIG. 7 is a close-up view of the measuring blade locking mechanism of the measuring device of FIG. 6.
Figure 8:
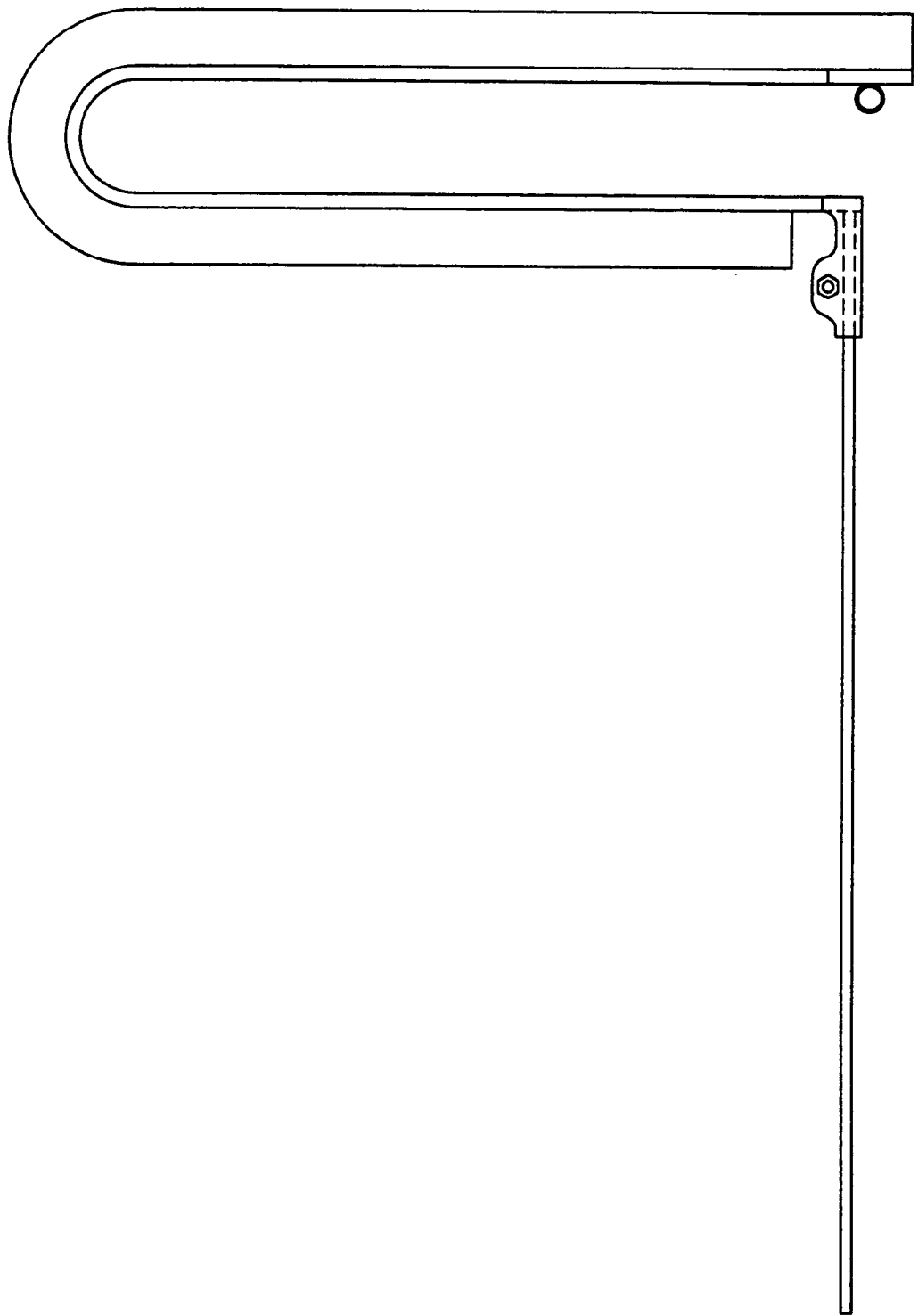
FIG. 8 is a side view of the measuring device of FIG. 7.
Figure 9:
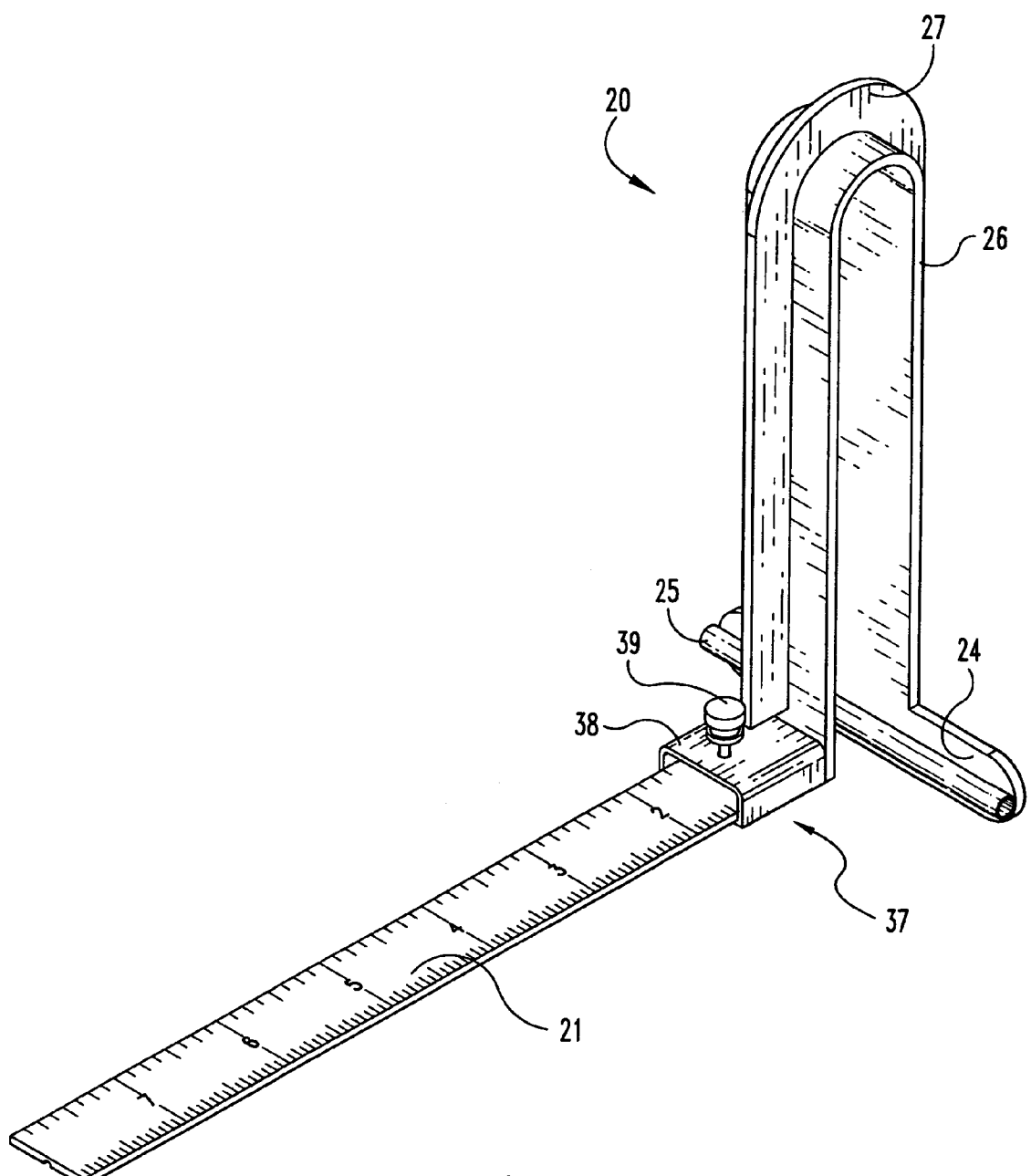
FIG. 9 is a perspective view of another embodiment of the measuring device of the present invention.
Figure 10:
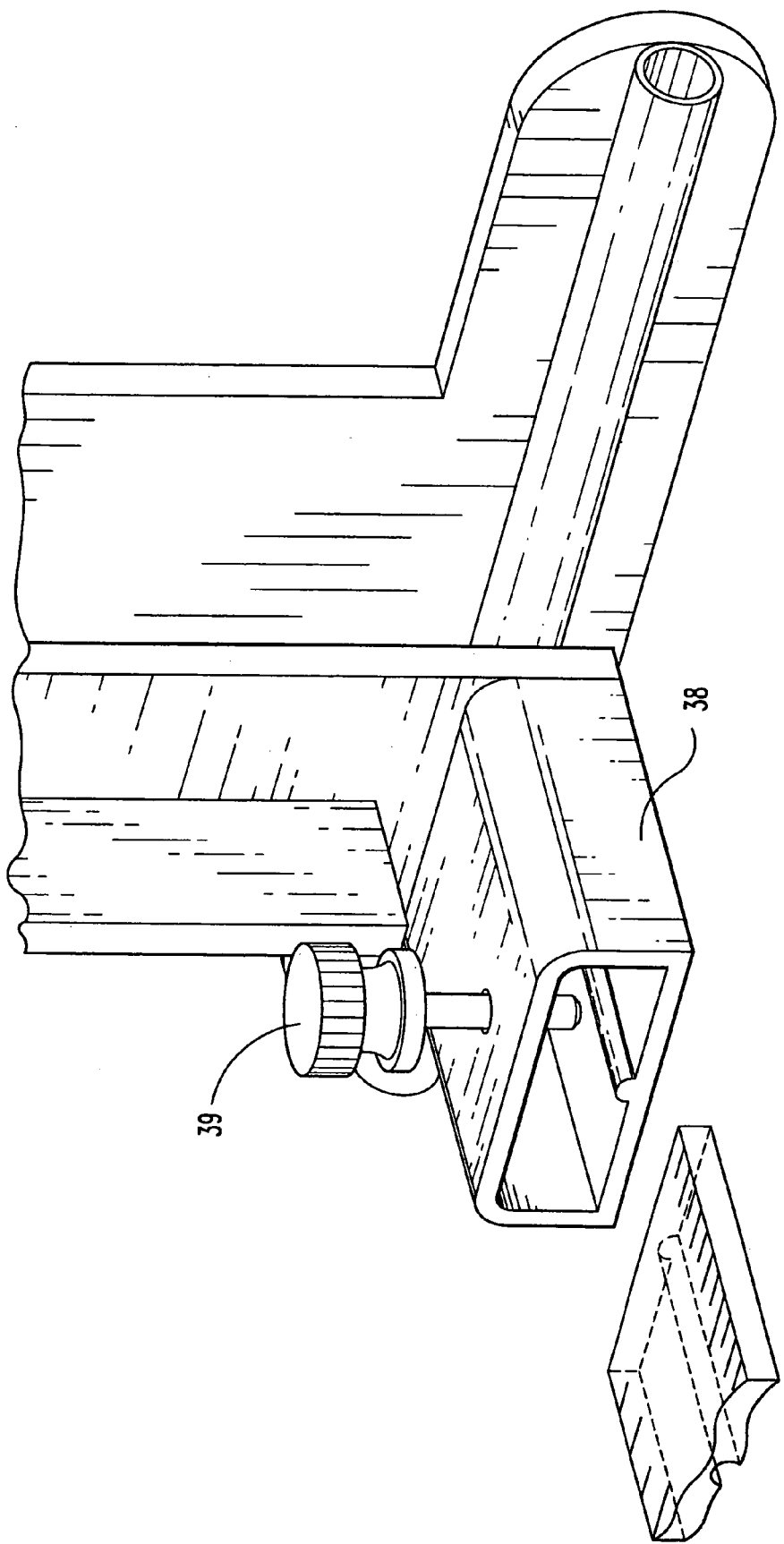
FIG. 10 is a close-up view of the measuring blade locking mechanism of the measuring device of FIG. 9.
Figure 11:
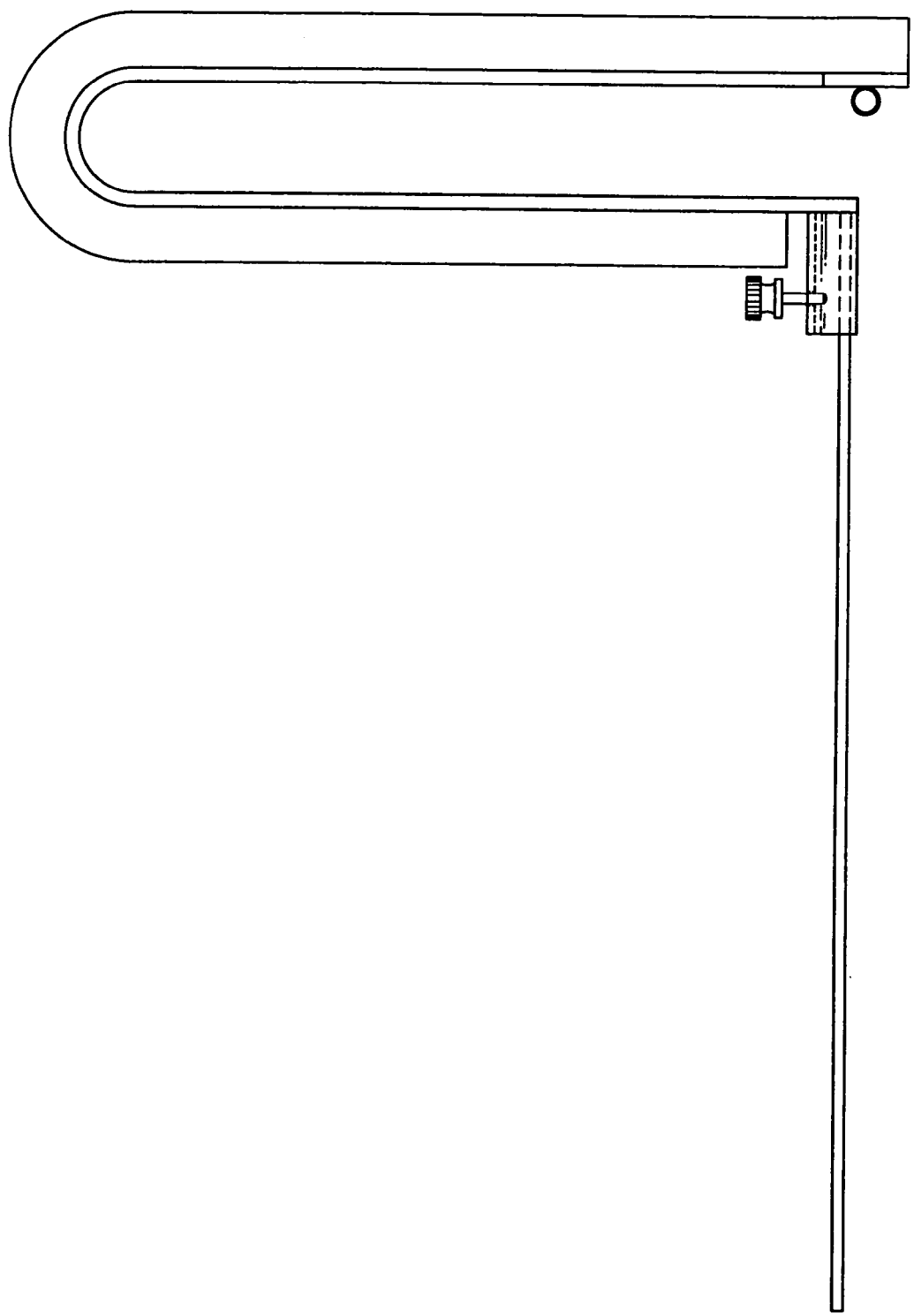
FIG. 11 is a side view of the measuring device of FIG. 10.

Referring now to the drawings, FIG. 6 shows one preferred embodiment of the measuring device. Measuring device 20 comprises a flange-contacting portion 24 for contacting the flange of an I-beam to be marked, and for defining a line parallel to the flange. Measuring blade 21 is provided to measure distances from the flange-contacting portion along the web of the beam. Bridging portion 26 connects measuring blade 21 to flange-contacting portion 24 by bridging the beam flange, as shown in FIG. 5. A handle portion 27 may be provided to make the device easier to grip, and to provide additional structural stability to bridging portion 26. Rib 25 may be included on flange-contacting portion 24 to aid in better defining a line perpendicular to the plans of the flange.

In one preferred embodiment the device includes a locking mechanism (alternatively referred to as a blade-gripping portion) to releasably hold measuring blade 21. Preferred locking mechanism 30 includes two slotted gripping members 31a and 31b, which can be pulled together by tightening a nut 33 on a bolt 34 protruding from either of the gripping members. The sides (bottoms) of the slots are perpendicular to the line defined by flange-contacting portion 24, so that measuring blade 21 is held perpendicular to the flange.

Preferably the dimensions of the slots in the slotted gripping members 31a and 31b are such that the "vertical" dimension is slightly larger than the thickness of the measuring blade to be used. With that dimension the blade is easily slid into and out of the slot, yet is held firmly by the gripping members. The "width" of the slots is such that when they are pulled together they contact the measuring blade before they contact each other, and thus grip and hold the measuring blade. Of course, the dimensions of the slots depend on the dimensions of the measuring blade to be used, but generally the slots will be about ⅛ inch high (defined by the vertical wall of the slot), about ⅜ inch wide (defined by the longest horizontal wall of the slot), and about 1 inch deep to accommodate a standard 1-inch wide measuring blade. In the most preferred embodiments the slotted gripping members have a slot 1/16 to ¼ inch high, ¼ to 1 inch wide, and ½ to 2 inches deep, although larger or smaller sizes could be made to accommodate larger or smaller measuring blades.

It is important that the gripping members hold the measuring blade perpendicular to the I-beam flange. Accordingly, measuring device 20 has a flange-contacting portion 24 that contacts the flange and defines a line (or a plane) generally parallel to the plane of the flange. Gripping members 31a and 31b are then positioned so that the slots therein are perpendicular to that line (or plane). When measuring blade is gripped by the gripping members, the blade is also perpendicular to the beam flange. In one preferred embodiment, flange-contacting portion 24 is equipped with a rib 25 to help better define a line parallel to the plane of the flange at the location being measured, i.e., at the outside of the flange opposite the center of the web.

In another embodiment the blade is held by a locking mechanism 37 comprising a housing 38 and a locking screw 39. Here too, the locking mechanism releasably holds the blade so that the blade is held in position perpendicular to the flange-contacting portion of the device.

Bridging portion 26 connects the blade-gripping portion to the flange-contacting portion. Preferably the bridging portion bridges the flange so that the device only contacts the flange at the flange-contacting portion opposite the web. The height of the bridging portion therefore depends on the height of the flange, but is typically about 7–10 inches. A handle portion 27 may be incorporated into bridging portion 26 to make the device easier to grip, and to lend additional structural support to the device.

The most preferred embodiments of the device include a measuring blade, although that piece can be provided by the end user if desired. Measuring blade 21 is marked with visual indicators of distance, most preferably distances from the outside of the flange opposite the web. Measuring blades such as common metal rulers can be used, with the blade preferably being cut so as to indicate the distance from the outer surface of the flange when the blade is held securely in the device. Generally, the blade is shortened by the distance from the flange-contacting portion to the nearest end of the blade, so that correct measurements are indicated.

It is to be appreciated that the device should be made of a material that is strong enough to withstand use on a construction site without becoming bent or broken. The strength of the bridging portion is of particular concern, since the distance between the flange-contacting portion and the end of the measuring blade should be constant over time. To assure proper measurements, the device should be calibrated regularly, and the blade can be lengthened or shortened if necessary.

To use the inventive device, the device is positioned over an I-beam flange so that the measuring blade rests on the beam web and the flange-contacting portion is pushed up against the outside of the flange, as shown generally in FIG. 5. The heights of the two arms of the bridging portion are such that the flange-contacting portion (most preferably the rib) contacts the flange opposite the center of the web when the measuring blade rests on the web surface. The device can then be used to mark points at specific distances from the outside of the flange, and to mark several points along a line perpendicular to the plane of the flange.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A device for measuring and marking lines and points on I-beams; comprising:
   (a) a flange-contacting portion for contacting the flange of an I-beam to be marked, and for defining a line parallel to the flange where the flange intersects the web of the beam;
   (b) a flat measuring blade for measuring distances from said flange-contacting portion along the web of the beam, wherein said flat measuring blade is not "T-shaped"; and
   (c) a bridging portion for connecting said measuring blade portion to said flange-contacting portion by bridging the beam flange, wherein said bridging portion terminates at one end in a blade-locking mechanism, wherein said blade-locking mechanism comprises two slotted gripping members that can be pulled together by the advancement of a nut on a threaded shank to lockingly secure said flat measuring blade therein, said blade-locking mechanism being perpendicular to said flange-contacting portion so that when said blade-locking mechanism is in its locked position the slotted gripping members secure said flat measuring blade in a position such that the measuring blade is perpendicular to a line parallel to the flange;
   wherein said flange-contacting portion extends in both directions along the line where the flange intersects the web of the beam, relative to the position of the measuring blade.

2. The device of claim 1 wherein said flange-contacting portion includes a rib for contacting the flange.

3. The device of claim 1 and further including a handle portion for providing a better grip on the device.

4. A device for holding a measuring blade for measuring and marking lines and points on I-beams; comprising:
   (a) a bridging portion for connecting a blade-gripping portion to a flange-contacting portion while bridging a beam flange, said bridging portion having a first end and a second end;
   (b) a flange-contacting portion connected to said first end of said bridging portion, said flange-contacting portion being adapted for contacting the flange of an I-beam to be marked, and for defining a line parallel to the flange where the flange intersects the web of the beam, wherein said flange-contacting portion extends in both directions, relative to the position of the bridging portion, along the line where the flange intersects the web of the beam;
   (c) a blade-gripping portion connected to said second end of said bridging portion, said blade-gripping portion being adapted for holding a flat, not "T-shaped" measuring blade for measuring distances from said flange-contacting portion along the web of the beam, wherein said blade-gripping portion includes a first slotted gripping member perpendicular to said flange-contacting portion and having a threaded shank parallel to said flange-contacting portion, and a second slotted gripping member lockable to said first slotted griping member by advancement of a nut on said threaded shank, said blade-gripping portion being adapted for lockably securing the measuring blade in a position such that the measuring blade is perpendicular to a line parallel to the flange.

5. The device of claim 4 wherein said flange-contacting portion includes a rib for contacting the flange.

6. The device of claim 4 and further including a handle portion for providing a better grip on the device.

* * * * *